(12) United States Patent
Shook et al.

(10) Patent No.: US 7,674,072 B2
(45) Date of Patent: Mar. 9, 2010

(54) CONNECTION BETWEEN A LATERAL AND MAIN PIPE AND METHOD FOR MAKING SAME

(76) Inventors: William E. Shook, 6843 NW. Trail Ridge Dr., Johnston, IA (US) 50131; Ted R. Dimitroff, 7850 E. Highway AB, Columbia, MO (US) 65201

( * ) Notice: Subject to any disclaimer, the term of this patent is extended or adjusted under 35 U.S.C. 154(b) by 848 days.

(21) Appl. No.: 11/372,299

(22) Filed: Mar. 9, 2006

(65) Prior Publication Data
US 2007/0210576 A1      Sep. 13, 2007

(51) Int. Cl.
*F16L 1/024* (2006.01)
(52) U.S. Cl. .................. 405/156; 405/159; 285/21.2; 285/197
(58) Field of Classification Search ............. 285/21.2, 285/197; 405/156, 159, 184.1, 184.3
See application file for complete search history.

(56) References Cited

U.S. PATENT DOCUMENTS

| | | | | |
|---|---|---|---|---|
| 344,760 | A | * | 6/1886 | Wilbur .................. 285/296.1 |
| 3,232,645 | A | | 2/1966 | Bucks |
| 3,902,563 | A | | 9/1975 | Dunn |
| 4,606,558 | A | * | 8/1986 | Davidson ................ 285/21.3 |
| 4,615,514 | A | * | 10/1986 | Hamlin ...................... 269/41 |
| 4,784,230 | A | | 11/1988 | Cherrington |
| 4,832,069 | A | * | 5/1989 | Gale et al. ............... 137/15.13 |
| 4,869,619 | A | * | 9/1989 | Akesaka .................... 405/184 |
| 4,921,374 | A | | 5/1990 | Stutzman |
| 5,088,194 | A | | 2/1992 | Lasko |
| 5,199,145 | A | | 4/1993 | McMillan |
| 5,364,207 | A | | 11/1994 | Reber |
| 5,388,869 | A | * | 2/1995 | Suzuki et al. .............. 285/197 |
| 5,649,786 | A | * | 7/1997 | Reber et al. ............. 405/154.1 |
| 5,839,647 | A | * | 11/1998 | Orne ......................... 228/212 |
| 5,842,496 | A | * | 12/1998 | Delanty et al. .......... 137/15.14 |
| 5,895,543 | A | | 4/1999 | Stiles |
| 6,669,406 | B2 | * | 12/2003 | Hutton et al. ............ 405/184.1 |
| 7,018,137 | B2 | * | 3/2006 | Hutton et al. ............ 405/184.1 |

FOREIGN PATENT DOCUMENTS

| | | |
|---|---|---|
| DE | 39 39 599 A1 | 6/1991 |
| EP | 0312724 A1 | 4/1989 |

OTHER PUBLICATIONS

"Electrofusion Installation Procedure Manual", Central Plastics Company, May 2003, pp. 32.
PCT International Search for Related Application PCT/US200/005801 mailed Jul. 30, 2007.
Search Report for Related Application (PCT/US2007/005801) mailed Oct. 25, 2007.

* cited by examiner

*Primary Examiner*—David E Bochna
(74) *Attorney, Agent, or Firm*—McKee, Voorhees & Sease, P.L.C.

(57) ABSTRACT

Apparatus and method for connecting a lateral pipe to a main pipe are provided by a tool having a first end within the main pipe and a second end outside the lateral pipe so as to apply pressure to the below-ground connection of the main and lateral pipes from an above-ground location. The entire operation may be done without a person having to enter into an access opening in the ground to connect the lateral pipe to the main pipe. A laser is used to determine the depth of the access hole relative to the surface of the ground and the main sewer pipe.

12 Claims, 6 Drawing Sheets

CONNECTION BETWEEN A LATERAL AND MAIN PIPE AND METHOD FOR MAKING SAME

FIELD OF THE INVENTION

The present invention relates to a connection between a lateral and a main pipe and a method for making same.

BACKGROUND OF THE INVENTION

The connection of lateral pipes to buried main pipes is a problem encountered in many new areas where new homes are being built and lateral pipes must be connected to the buried main pipe. The present methods for making this connection involve the digging of an access hole big enough to permit a person to enter a large open cut or excavated pit to make the lateral service connection.

Another disadvantage of present methods is the accurate location of the depth of the main line pipe and the slope of the main line pipe relative to the ground surface.

Another disadvantage of present prior art methods is the lack of a cutting tool which cuts a hole in the main pipe, fits within the main line pipe, and holds the lateral pipe to the main line pipe while adhesive or other attachment means are cured.

Another disadvantage of present prior art tools is the inability of the tool to centrifugally operate flanges that spread outwardly within the main pipe and hold the lateral pipe to the main pipe during the time that an adhesive or other material is cured and hardened.

Another disadvantage of present devices is the inability to remove tools from inside the main and lateral pipes after the connection is made.

Therefore a primary object of the present invention is the provision of an improved connection between the lateral and main pipe and method for making that connection.

A further object of the present invention is the provision of a connection between a lateral and main pipe and method for making same which does not require a person to enter an access hole to make the connection.

A further object of the present invention is the provision of a connection between a lateral and a main pipe and a method for making same which shows accurate location of depth of the main line pipe and the slope of the main line pipe relative to the ground surface.

A further object of the present invention is the provision of an improved connection between a lateral and a main pipe and method for making same that provides a tool for cutting a hole in the main pipe.

A further object of the present invention is the provision of an improved connection between the lateral and the main pipe which includes a tool capable of fitting within the main line pipe and holding the lateral pipe to the main line pipe while adhesive cures and hardens.

A further object of the present invention is the provision of a tool that has a centrifugally operating flange that spreads outwardly within the main pipe and holds the lateral pipe to the main pipe during the time that the adhesive cures and hardens.

A further object of the present invention is the provision of a tool that is removable from inside the main and lateral pipes after the connection is made.

A further object of the present invention is the provision of an apparatus that is efficient in operation, durable in use and economical to manufacture and operate.

BRIEF SUMMARY OF THE INVENTION

The foregoing objects may be achieved by an apparatus for connection between a lateral pipe and a main pipe. The main pipe is buried in the ground and an excavation hole is provided for making communication between the atmosphere above the ground and the main pipe buried in the ground. The connection comprises a main pipe having a main bore extending through a main pipe wall. A lateral pipe includes a lateral pipe bore extending through a lateral pipe wall. The lateral pipe includes a lateral end engaging the main pipe wall. A main pipe opening is provided in the main pipe wall. A tool holds the lateral pipe to the main pipe with the main pipe opening providing communication between the lateral pipe bore and the main pipe bore. The first portion of the tool engages the lateral pipe and the second portion of the tool engages the main pipe.

According to another feature of the present invention the first and second portions of the tool force the lateral pipe toward the main pipe.

According to another feature of the present invention a saddle on the lateral pipe surrounds the main pipe opening and engages the main pipe.

According to another feature of the present invention the lateral pipe is either connected to the saddle or is formed integrally therewith.

According to another feature of the present invention, the excavation hole is sufficiently small that the excavation hole does not provide access to a human.

According to another feature of the present invention a saddle is provided adjacent the main pipe opening and engages both the exterior surface of the main pipe and the lateral pipe. The saddle, the main pipe and the lateral pipe are connected to one another with the lateral pipe bore being in communication with the main pipe bore.

According to another feature of the present invention an uncured adhesive is between the saddle and the main pipe. The adhesive is curable to attach the saddle to the main pipe.

According to another feature of the present invention the connection between the lateral pipe and the main pipe is provided by supplying an attachment material in an uncured state between the lateral end of the pipe and the exterior surface of the main pipe wall. A tool is provided for holding the lateral pipe in contact with the main pipe during curing of the attachment material. The tool includes a first portion within the main pipe bore and a second portion outside the main pipe bore and is removable from both the main pipe and the lateral pipe after the attachment material has cured.

The foregoing objects may be achieved by a method of the present invention. The method includes connecting a main pipe buried in the ground to a lateral pipe. The lateral pipe has first and second lateral pipe ends and a lateral pipe bore, as well as a lateral pipe wall. The main pipe includes a main pipe bore and a main pipe wall. The method comprises excavating an access hole in the ground in communication with the main pipe. An uncured connection material is placed on the first end of the lateral pipe, the uncured connection material being capable of curing. A lateral pipe is inserted into the access hole so that the uncured connection material engages the main pipe. The main pipe is then cut to provide a main pipe opening in the main pipe wall thereby providing communication between the lateral pipe bore and the main pipe bore through the main pipe opening. A tool is used to hold the lateral pipe and the main pipe together while the connection material cures and attaches the lateral pipe to the main pipe. The tool is removed from the lateral pipe and the main pipe.

According to another feature of the present invention the lateral pipe includes an attachment member thereon. The uncured connection material is at least partially on the attachment member. The inserting step comprises placing the attachment member on the main pipe with the uncured material being between and engaging both the attachment member and the main pipe.

According to another feature of the present invention the tool includes a first tool portion within the main pipe bore and a second tool portion retentively engaging the main pipe. The method further comprises pressing the first tool portion towards the second tool portion for holding the lateral pipe and the main pipe together.

According to another feature of the present invention the entire process is accomplished by preventing any personnel from entering the access hole throughout all the steps in the method.

DETAILED DESCRIPTION OF THE PREFERRED EMBODIMENT

Figure 1:
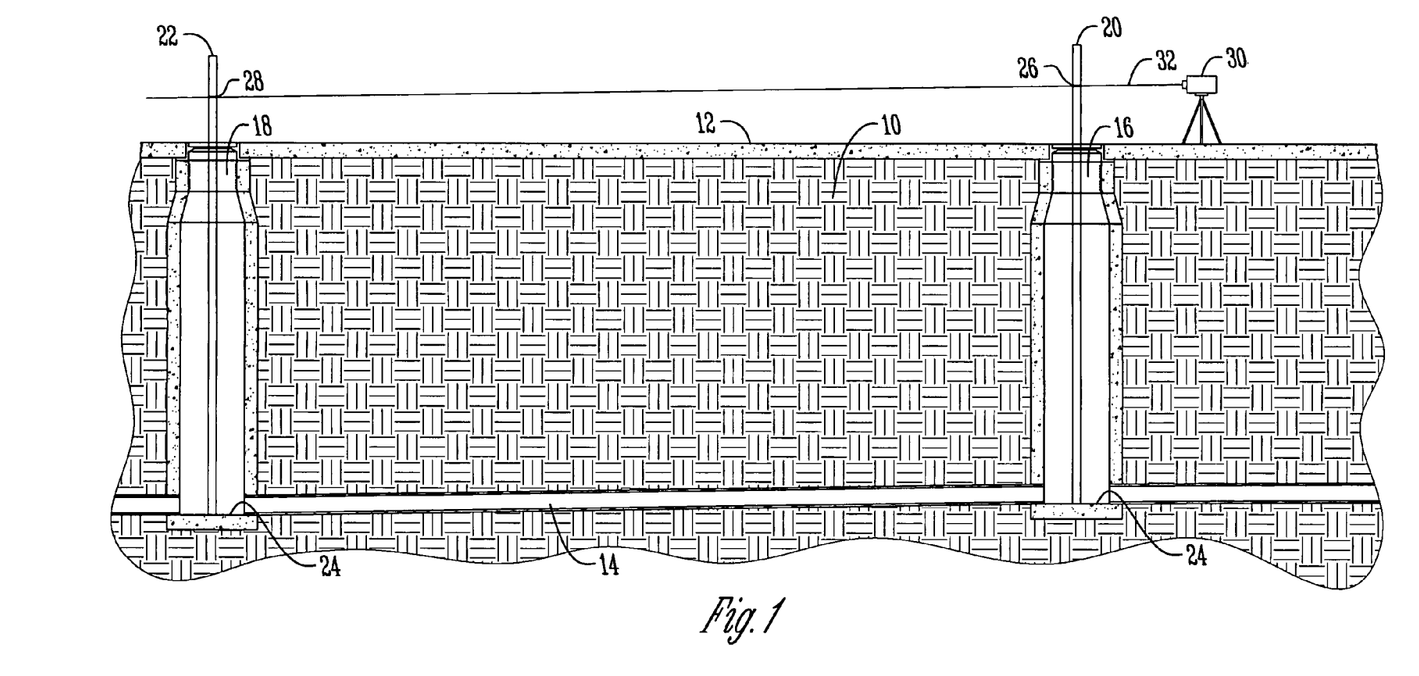
FIG. 1 is a sectional view showing the main line pipe connecting two manholes.

Referring to the drawings, the numeral 10 generally designates the ground in which a main sewer pipe 14 is buried. The ground surface is represented by the numeral 12. A first manhole 16 is provided in the ground in communication with the main sewer pipe 14 and a second manhole 18 is also provided in the ground 10 providing communication to a second place in the sewer pipe 14.

A first stake 20 and a second stake 22 are inserted into the first and second manholes 16, 18 respectively, and engage the bottom wall 24 of the manholes 16, 18. Each of the stakes is marked with a first stake mark 26 and a second stake mark 28 equidistant above the lower ends of the stakes 20, 22 so that the first and second stake marks provide a reference point for the slope of the main sewer pipe 14 between the two manholes 16, 18. A laser emitter 30 emits a laser beam 32 which is lined up with the marking 26, 28 on the stakes 20, 22. This shows the slope of the main sewer line 14 relative to the surface 12 of the ground. Then it is possible to determine how deep of a hole is necessary in order to drill down to the main sewer pipe 14 at any given point along the length of laser beam 32.

Figure 2:
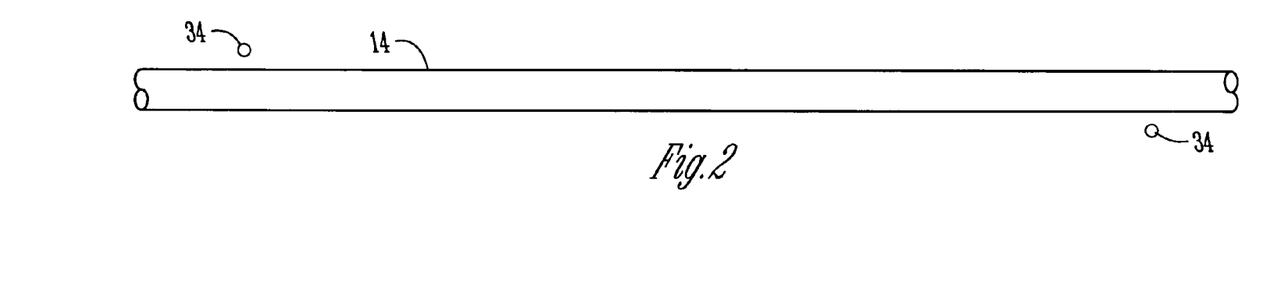
FIG. 2 is a sectional top view of FIG. 1 showing the drilling of pilot holes for providing access to the main sewer pipe.

Referring to FIG. 2, a pair of pilot holes 34 are drilled in the ground 10 relative to the main sewer pipe 14. These pilot holes 34 are drilled to one side or the other of main pipe 14, and are drilled to a depth which extends several inches (perhaps a foot or more) below the main sewer pipe 14 as can be seen in FIG. 3.

Figure 3:
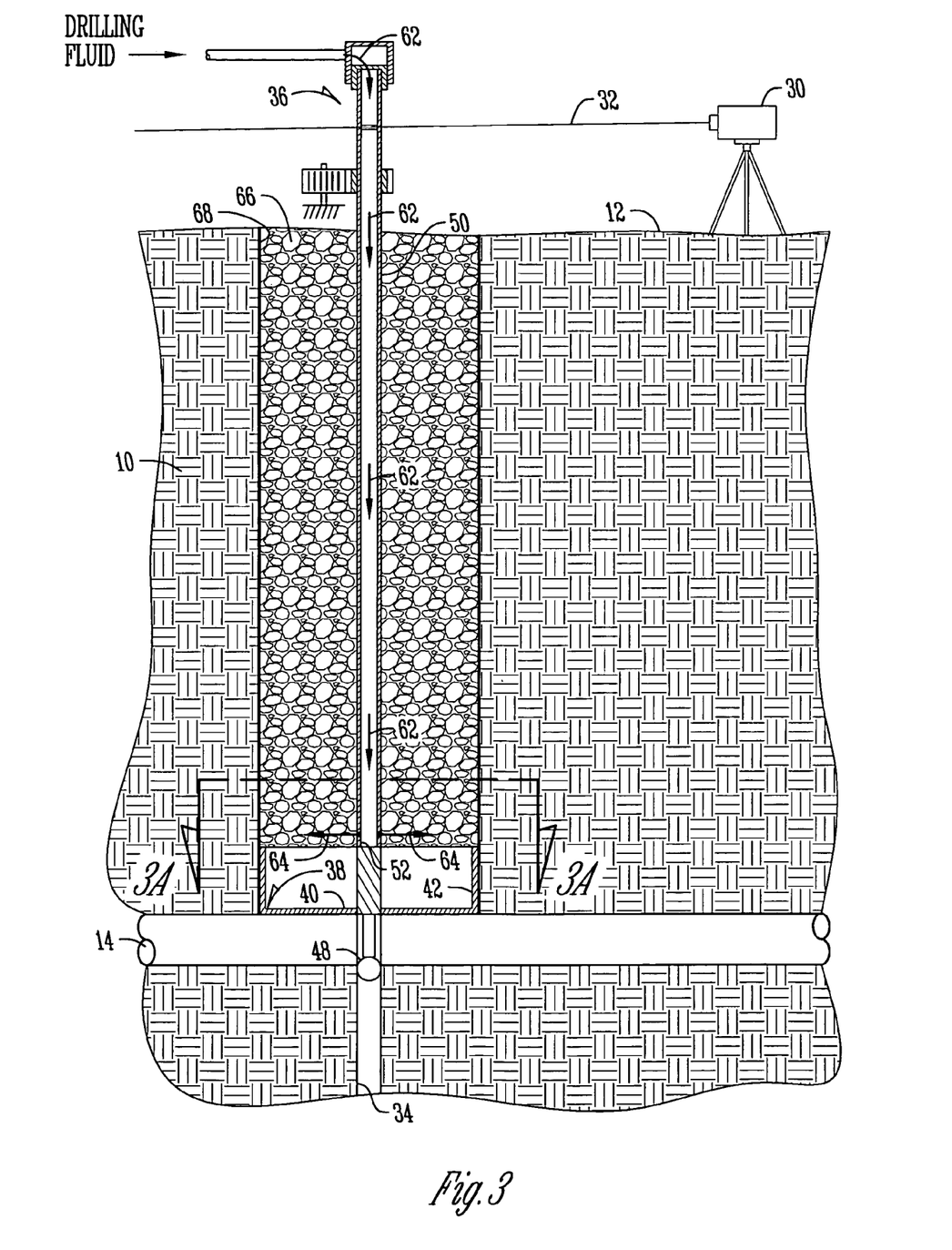
FIG. 3 is a sectional view showing the provision of a reamer for cutting an access hole having loose dirt or slurry therein.
Figure 3A:
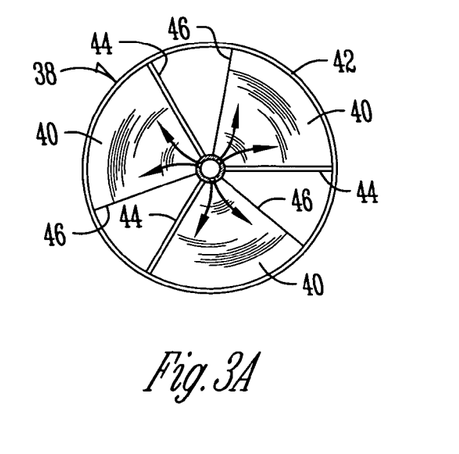
FIG. 3A is a sectional view taken along line 3A-3A of FIG. 3.
Figure 4:
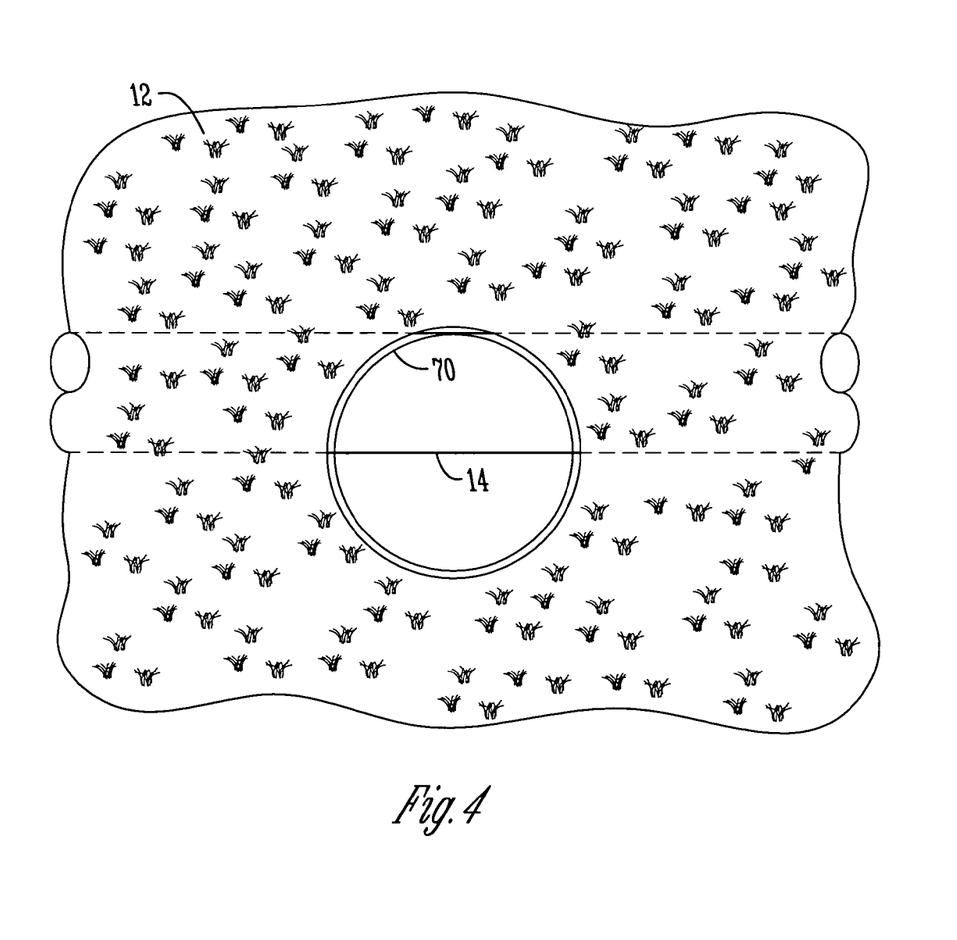
FIG. 4 is plan view taken above the ground of the access opening after the insertion of a sleeve into the access hole.

FIG. 3 shows a reamer assembly 36 which is shown at its bottom position with the loose dirt or slurry 66 located thereabove. The reamer assembly 36 includes a reamer head 38 located adjacent its bottom. Reamer head 38 includes three sections of a bottom reamer wall 40 (FIG. 3A) and a parametric reamer wall 42. A plurality of radially extending reinforcing ribs 44 extend from the center of reamer head 38 to the outside parametric reamer wall 42. Each of the bottom reamer wall sections 40 is provided with a cutting edge 46 which is adapted to cut the ground 10 and move the ground 10 upwardly above the bottom reamer walls 40. Extending downwardly from reamer head 38 is a stem with a ball-shaped cap 48 which fits within the pilot hole 34 and provides guiding movement for the reamer head 38.

Extending upwardly from reamer head 38 is a reamer tube 50 having a tube bore 52 extending upwardly therefrom. The reamer tube 50 is connected to a vertical drilling rig, thereby causing reamer head 38 to rotate. A drilling fluid is used, as indicated by arrows 62. At the bottom of the tube bore 52 the drilling fluid extends radially outwardly through openings in the tube 50 as shown by the radial fluid arrows 64. The fluid provides a slurry of the loose dirt 66 above the reamer head 38, and this is shown in FIG. 3. Furthermore, the fluid soaked walls 68 of the excavated hole or access opening are coated in such a manner as to prevent the caving in of the access opening provided by the reamer head 38.

After the reamer head 38 has reached the bottom position shown in FIG. 3, the reamer head 38 is removed from the hole. Then a reinforcing sleeve 70 is inserted into the access hole so as to prevent caving in of the walls of the access opening. The fluid soaked walls 68 help prevent caving in until the sleeve 70 has been fully inserted. Then, the loose dirt or slurry 66 is sucked out of the access opening to reveal the pipe.

Figure 5:
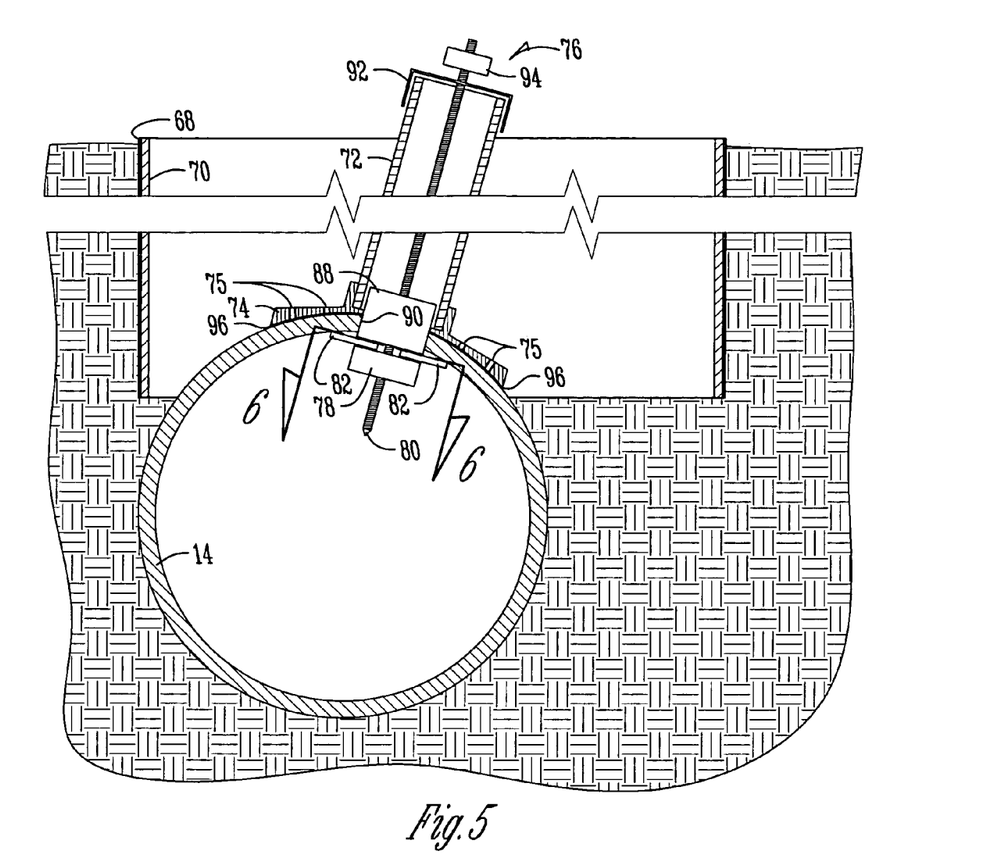
FIG. 5 is a sectional view showing the main line pipe and the tool for attaching the lateral line pipe to the main line pipe.

As seen in FIG. 5, a lateral pipe 72 is operatively secured to a saddle 74 by adhesive, resin, or other suitable means so that the lateral pipe 72 and the saddle 74 are secured together in unitary fashion. The lower surface of the saddle 74 has a bonding material 96, such as an adhesive, resin, or other suitable material in an uncured state. Alternatively, the bonding material 96 may be electrical wires which provide electrical current to form an electro-fusion bond or weld between the saddle 74 and the main pipe 14. The electro-fusing wires (not shown) may extend downwardly through the access opening and beneath the saddle 74, for remote activation from the top of the access hole. The bonding material may also be any other suitable material to form a heat-activated bond or a chemical bond. The lateral pipe 72 with the saddle 74 and the bonding material thereon are then inserted into the access opening from above ground and are placed in loose contact with the outer surface of the main sewer pipe 14.

A cutting and anchoring tool 76 is then used to complete the operation. The tool 76 includes a hole saw 78 which is of conventional construction and which is adapted to cut a hole or opening 90 in the main sewer line 14. This is accomplished by rotating a pilot drilling bit 80 which has affixed thereto the hole saw 78 and cuts a pilot hole or opening in the main pipe 14. Rotation of the pilot drilling bit 80 causes rotation of the hole saw 78 and causes the hole saw 78 to cut the enlarged opening 90 in the main sewer pipe 14.

Figure 6:
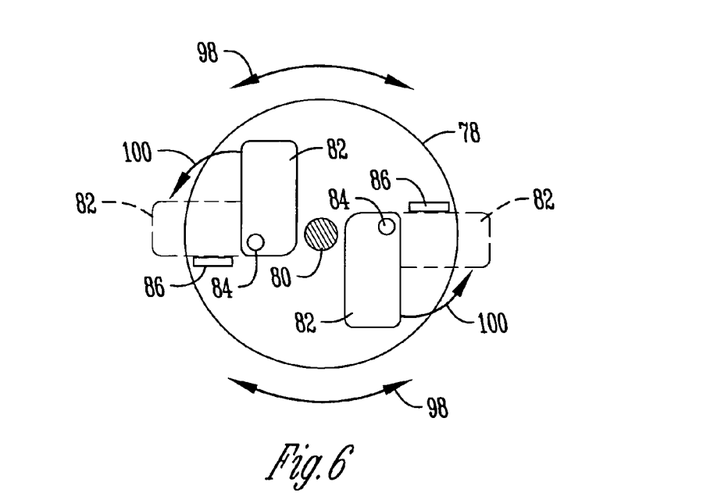
FIG. 6 is a sectional view taken along line 6-6 of FIG. 5.

The rotation of the pilot drilling bit 80 and the cutting saw or hole saw 78 is shown in FIG. 6. When the hole saw 78 is rotated in a counterclockwise direction as indicated by arrow heads 98, the holding flanges or anchors 82, by virtue of their pivotal mounting 84 naturally rotate inwardly to the position shown in solid lines in FIG. 6. Thus the anchors 82 are inside the outer perimeter of hole saw 78.

Once the hole saw 78 is within the interior of main sewer pipe 14, as well as the anchors 82, the rotation of the hole saw is reversed to be in a clockwise direction. This causes the anchors 82 to pivot about the pivotal connection 84 and to move to the position shown in broken lines in FIG. 6 with the tips of the anchors 82 positioned radially outwardly from the outer perimeter of hole saw 78. Stops 86 prevent the holding flanges or anchors 82 from further pivotal movement. The rotating flanges 82 rotate from their solid position shown in FIG. 6 to their broken line position shown in FIG. 6 in the direction of arrows 100.

An upper cap 92 engages the upper end of lateral pipe 72. A nut 94 is then threadably twisted to move it downwardly on the pilot drilling bit 80. Ultimately, the nut 94 compresses the lateral pipe 72 toward the main pipe 14 by virtue of the engagement of the nut 94 and the anchors 82. The centering mandrel 88 is positioned above the anchors 82 and is adapted to center the tool within the opening 90 that has been cut through the main sewer pipe 14. The nut 94 which is turned to apply pressure to the connection between the pipes 14, 72 at the bottom of the access hole is remote from the connection.

Figure 8:
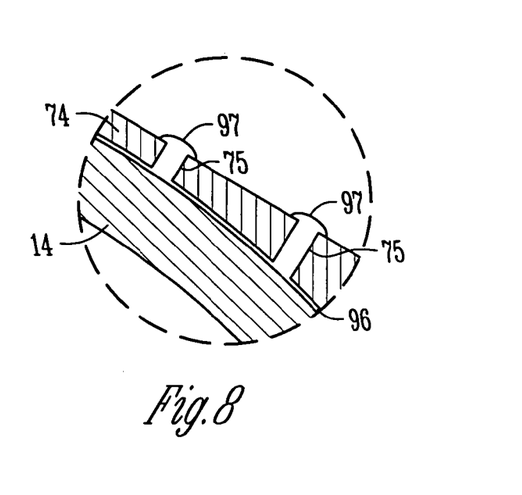
FIG. 8 is an enlargement showing the connection between the main pipe and the lateral pipe saddle.

The continued pressing of the lateral pipe 72 toward the main pipe 14 causes the saddle 74 to be pressed against the outer surface of the main pipe 14. This pressing action is continued until a secure bond is formed, such as by curing of adhesive, so as to attach the lateral pipe 72 to the main pipe 14. In a preferred embodiment, the saddle 74 includes holes or slots 75 which allow adhesive, resin or other material 96 to pass therethrough as the lateral pipe 72 is clamped to the main pipe 14 by the holding tool 76. The material 96 forms a bead or head 97 on the exterior of the saddle 74 as best seen in FIG. 8, to further strengthen the connection between the lateral pipe 72 and main pipe 14. As an alternative to holes 75, a plurality of grooves can be formed in the inner surface of the saddle 74 to enhance the mechanical adhesive bond.

To remove the tool 76 from the lateral pipe 72 all that is necessary is to again reverse the rotation of the hole saw 78 in a counter clockwise direction so as to cause the anchors 82 to pivot radially inwardly to the position shown in solid lines in FIG. 6, against the direction indicated by arrows 100. This permits the tool to be removed upwardly through the hole 90 out of the interior of main pipe 14 and furthermore out of the interior of lateral pipe 72.

Figure 5A:
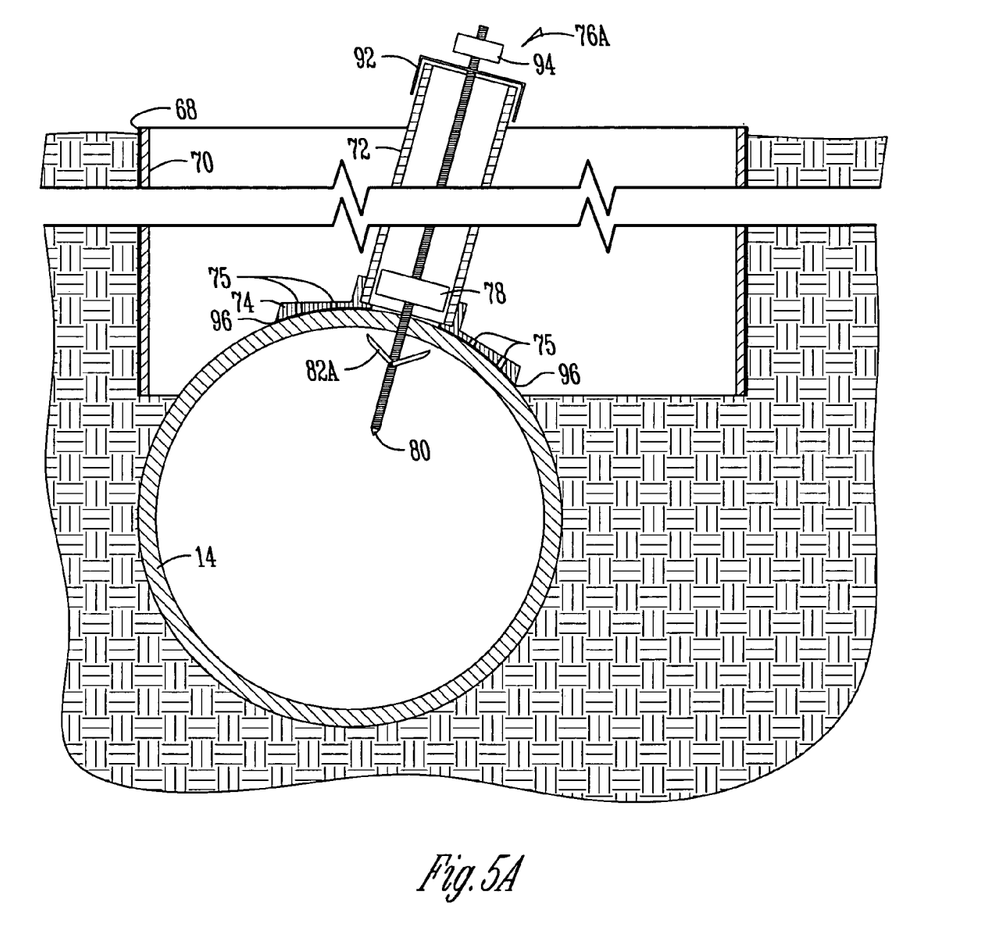
FIG. 5A is a view similar to FIG. 5 showing an alternative embodiment of the tool.

FIG. 5A shows an alternative cutting and anchoring tool 76A having a toggle bolt anchor 82A. Use of the tool 76A differs from the use of the tool 76 in that the hole saw 78 does not cut the opening 90 in the main sewer pipe 14 until after the lateral pipe 72 and the saddle 74 are securely bonded to the main sewer pipe 14. More particularly, the pilot drill 80 makes a relatively small hole in the main sewer pipe 14 which is sufficiently large for the toggle bolt anchor 82A to pass through. The anchor 82A then springs open inside the main pipe 14 to engage the interior surface of the pipe 14. The nut 94 is then tightened so that the upper cap 92 and toggle bolt anchor 82A compress the lateral pipe 72 toward the main pipe 14. The centering mandrel 88 of the tool 76 is not necessary on the tool 76A. As with tool 76, the tool 76A applies pressure to the connection between the pipes 14, 72 remotely from the connection. After the bond has solidified, the hole saw cuts the hole 90 in the main sewer pipe 14, and the tool 76A is then pulled upwardly out of the lateral pipe 72 with the cut out portion or coupon from the main pipe 14 being removed therewith. An air-tight seal (not shown) may be provided inside or outside the main pipe 14 adjacent the small hole from the pilot drill 80 to permit air or vacuum testing prior to cutting the larger hole 90 so as to check for leaks in the connection between the main pipe 14 and the lateral pipe 72.

Figure 7:
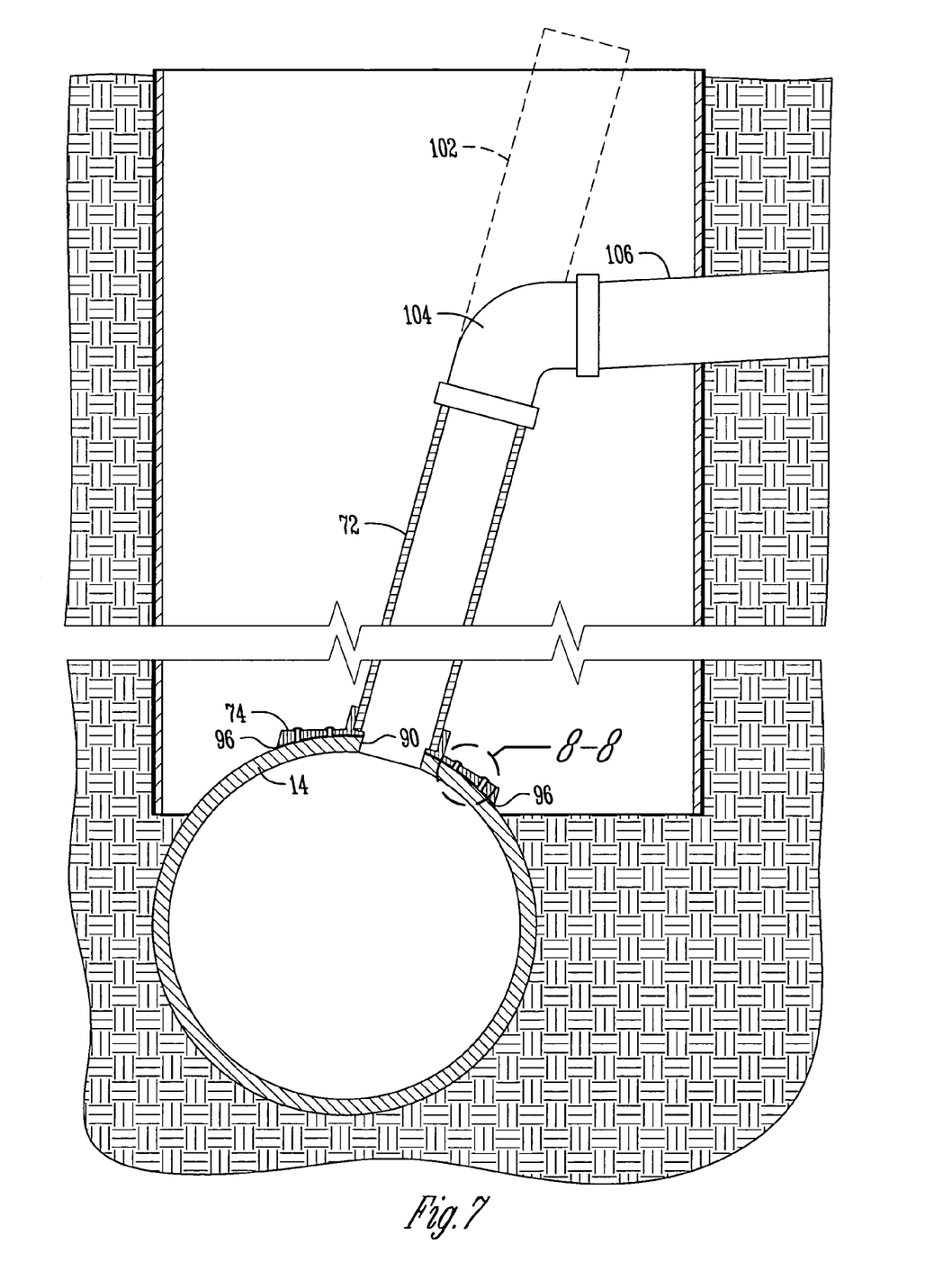
FIG. 7 is a view similar to FIG. 5, but showing the completion of the attachment of the lateral pipe to the main pipe.

As shown in FIG. 7, the upper end of lateral pipe, as indicated in hidden lines by the numeral 102, is removed by cutting or other means. An elbow 104 is provided in the lateral pipe 72 and a second lateral pipe 106 is connected thereto and buried and leads to the house (not shown). FIG. 7 shows the completed process, and shows the access opening 90 provided in main pipe 14 so that the bore of the lateral pipe 72 is in communication with the interior of the bore of main pipe 14.

From the foregoing apparatus and process it can be seen that the objects of the present invention are obtained. There is an improved connection between the lateral and the main pipe and the method provides this improved connection. There is no requirement that a person enter the access hole to make the connection, and in fact the entire process can be accomplished above ground, with the lateral pipe 72 and the saddle 74 protruding downwardly to the main pipe 14. The present invention allows accurate location of the depth of the main line pipe and the slope of the main line pipe relative to the ground. This is accomplished by means of the laser 32.

A tool is provided for fitting within the main pipe line and holding the lateral to the main pipe line. Important to this feature is the fact that the tool includes apparatus for engaging the interior of the main line pipe 14 and for squeezing the lateral pipe 72 toward the outside surface of the main line pipe 14 while the adhesive or resin cures and hardens. Equally important is the ability to remove the tool from the interior of the main pipe 14 by merely reversing the rotational direction of the tool.

The tool includes centrifugally operating flanges that spread outwardly within the main pipe and hold the lateral pipe tightly against the main pipe. The present invention is efficient in operation, durable in use and economical to manufacture and operate.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A method for connecting a main pipe buried in the ground to a lateral pipe without a person climbing into a hole in the ground to reach the main pipe, the lateral pipe having upper and lower ends, the main pipe having a pipe wall with interior and exterior surfaces, the method comprising:

excavating an access hole in the ground in communication with the main pipe;

placing bonding material on the lower end of the lateral pipe;

inserting the lateral pipe into the access hole so that the bonding material engages the outer surface of the main pipe wall at a connection point;

cutting an opening in the main pipe wall adjacent the connection point to provide communication between the lateral pipe and the main pipe, the opening having a diameter substantially equal to the inside diameter of the lateral pipe;

applying pressure to the connection point from a remote location above the ground while the bonding material forms a secure bond between the lateral pipe to the main pipe;

the pressure being applied using a tool having a first end engaging the inner surface of the main pipe wall and a second end above the ground outside the lateral pipe; and removing the pressure.

2. The method of claim 1 wherein the opening is cut before the pressure is applied.

3. The method of claim 1 wherein the opening is cut after the pressure is applied.

4. The method of claim 1 wherein the lower end of the lateral pipe includes a saddle thereon, the bonding material being at least partially on the saddle, the inserting step comprising placing the saddle on the main pipe with the bonding material being between and engaging both of the saddle and the main pipe.

5. The method of claim 4 further comprising providing holes on the saddle and allowing bonding material to flow through the holes to form retaining heads on an exterior of the saddle.

6. The method of claim 1 and further comprising preventing any personnel from entering the access hole throughout all steps in the method.

7. The method of claim 1 wherein the bonding material is an adhesive to form an adhesive bond.

8. The method of claim 1 wherein the bonding material is one or more electrical wires to form an electro-fusion bond.

9. The method of claim 1 wherein the bonding material is selected from a group capable of forming a mechanical bond, an electro-fusion bond, a heat-activated bond, and a chemical bond.

10. The method of claim 1 further comprising testing for air leaks between the main pipe and lateral pipe connection point.

11. The method of claim 1 wherein the bonding material is an adhesive, and the method further comprising allowing adhesive to flow through holes in the lower end of the lateral pipe to form retaining heads.

12. The method of claim 1 wherein the lower end of the lateral pipe includes a perforated saddle, and wherein the method further comprises forming retention heads from bonding material flowing through the perforated saddle and then solidifying.

* * * * *